United States Patent
Snell

(10) Patent No.: US 6,167,777 B1
(45) Date of Patent: Jan. 2, 2001

(54) TILTABLE STEERING COLUMN LOCK MECHANISM

(75) Inventor: William M. Snell, Grand Blanc, MI (US)

(73) Assignee: Chrysler Corporation, Auburn Hills, MI (US)

(*) Notice: Under 35 U.S.C. 154(b), the term of this patent shall be extended for 0 days.

(21) Appl. No.: 09/211,508

(22) Filed: Dec. 14, 1998

(51) Int. Cl.⁷ .................. B62D 1/18; F16B 7/10
(52) U.S. Cl. .......... 74/493; 280/775; 403/109.1; 403/104
(58) Field of Search ............ 74/492, 493; 280/777, 280/775; 403/109.3, 109.1, 104

(56) References Cited

U.S. PATENT DOCUMENTS

| | | | |
|---|---|---|---|
| 2,770,981 | * 11/1956 | Fieber | 74/493 |
| 2,903,904 | 9/1959 | Mackie | 74/493 |
| 3,310,993 | * 3/1967 | Kimberlin et al. | 74/493 |
| 4,463,626 | 8/1984 | Kazaoka et al. | 74/493 |
| 4,893,518 | * 1/1990 | Matsumoto et al. | 74/493 |
| 4,934,737 | 6/1990 | Nakatsuka | 280/775 |
| 5,029,489 | 7/1991 | Burmeister et al. | 74/493 |
| 5,193,848 | 3/1993 | Faulstroh | 280/775 |
| 5,209,512 | 5/1993 | Hancock et al. | 280/775 |
| 5,222,410 | 6/1993 | Kinoshita | 74/493 |
| 5,282,394 | 2/1994 | Dominique et al. | 74/493 |
| 5,346,255 | * 9/1994 | Schafer et al. | 74/493 X |
| 5,419,581 | * 5/1995 | Schafer et al. | 74/493 X |
| 5,439,252 | * 8/1995 | Oxley et al. | 280/775 |
| 5,509,324 | * 4/1996 | Cymbal | 74/492 |
| 5,588,332 | 12/1996 | Hedderly | 74/493 |
| 5,678,454 | 10/1997 | Cartwright et al. | 74/493 |
| 5,706,706 | * 1/1998 | Kitamura | 403/104 X |
| 5,707,167 | * 1/1998 | Battocchio | 403/104 X |
| 5,813,289 | * 9/1998 | Renick et al. | 74/493 |
| 5,848,557 | * 12/1998 | Sugiki et al. | 74/493 |
| 5,890,397 | * 4/1999 | Stoner et al. | 74/493 |
| 5,911,789 | * 6/1999 | Keipert et al. | 74/493 |
| 6,036,228 | * 3/2000 | Olgren et al. | 280/775 X |

* cited by examiner

*Primary Examiner*—David A. Bucci
*Assistant Examiner*—Colby Hansen
(74) *Attorney, Agent, or Firm*—Lawrence J. Shurupoff

(57) ABSTRACT

The tiltable component in a tilt type vehicle steering column can be locked in selected positions of adjustment by an external locking mechanism that includes an elongated rod having pivot connections with the stationary and movable components of the column. A rotatable locking sleeve encircles the rod to form a rigid connection between the rod and one of the pivot connections. Meshed teeth on the rod and sleeve prevent the rod from moving in the longitudinal direction. By rotating the sleeve on the rod it is possible to shift the teeth out of mesh, such that the rod can move longitudinally to set the movable component of the steering column in a new selected position of adjustment.

6 Claims, 4 Drawing Sheets

TILTABLE STEERING COLUMN LOCK MECHANISM

BACKGROUND OF THE INVENTION

The present invention relates to tiltable steering column assemblies for automotive vehicles, and particularly to a lock mechanism for retaining the tilting component of the steering column in selected positions of adjustment.

DESCRIPTION OF PRIOR DEVELEOPMENTS

Vehicle steering columns are often provided with a tiltable component that enables the steering wheel to be set at varying degrees of tilt, according to the desires and needs of different persons that might have occasion to drive the vehicle. Typically a manually operable lock mechanism is provided for retaining the steering wheel component in selected positions of tilt adjustment.

Representative lock mechanisms for tiltable steering columns are shown in U.S. Pat. No. 5,282,394 to A. Dominique et al, and U.S. Pat. No. 4,463,626 to K. Kazaoka et al, and U.S. Pat. No. 5,222,410 to S. Kinoshita.

The present invention relates to a tiltable steering column lock mechanism having a modular construction, whereby the lock mechanism can be used on a range of different vehicles without extensive redesign of the steering column or lock mechanism.

The lock mechanism is designed to have high strength and ruggedness, while being relatively small and compact for ready installation in a range of different size vehicles. A special feature of the invention is the use of an elongated rod between the steering column components, in combination with a locking sleeve that encircles the rod to retain the rod in selected positions of adjustment. The rod and sleeve have mating teeth that are discontinuous in the circumferential plane, whereby the sleeve can be rotated around the rod axis to move the teeth into or out of mesh.

The sleeve grips the external surface of the rod, such that when the teeth are in mesh, the teeth are precluded from separation, even under high impact accident conditions when high forces might be imposed on the steering column components. Specific features of the invention will be apparent from the attached drawings and description of a particular embodiment of the invention.

DESRIPTION OF A PREFERRED EMBODIMENT OF THE INVENTION

Figure 1:
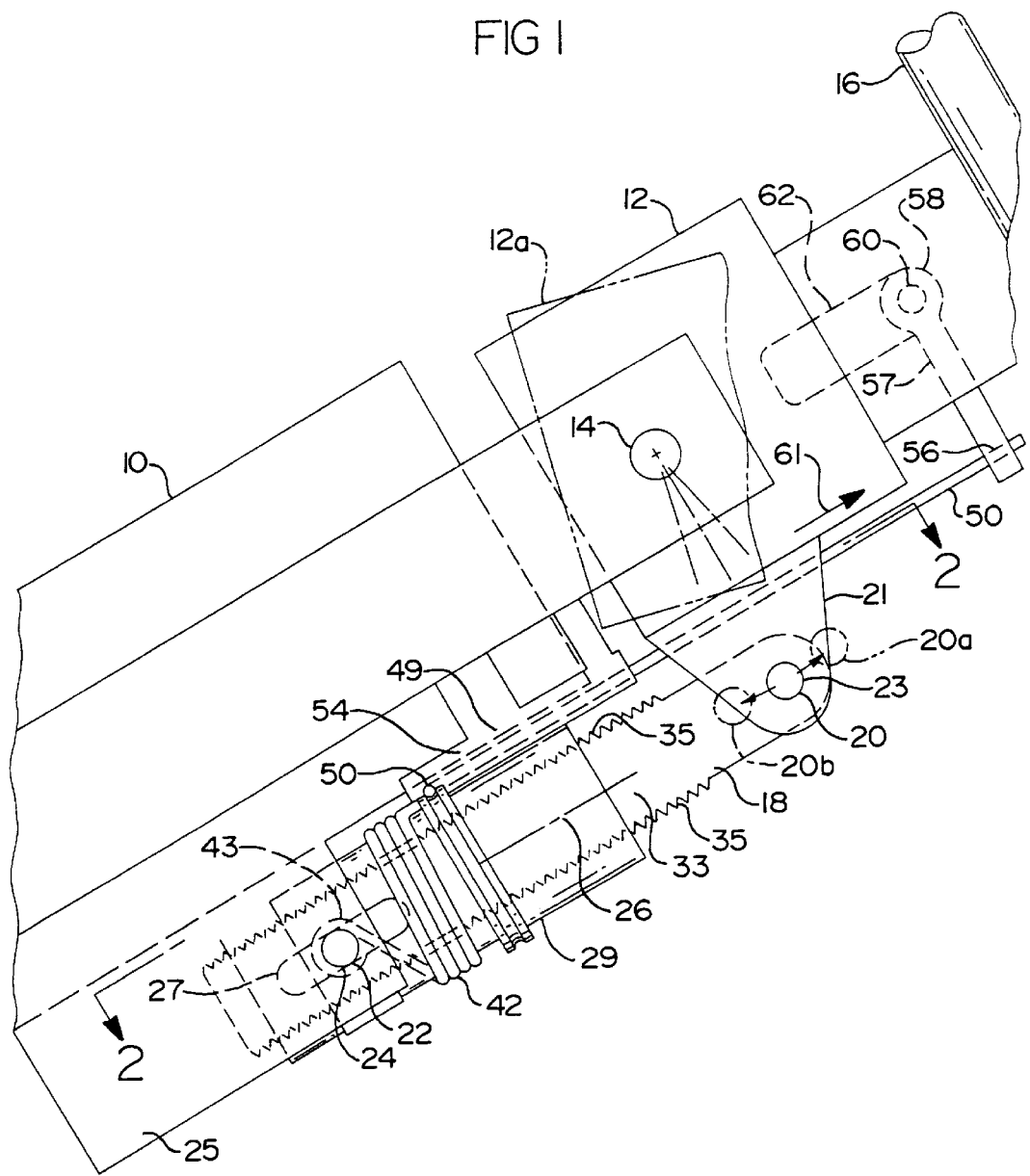
FIG. 1 is a fragmentary side elevational view of a vehicle steering column having a tilt lock mechanism of the present invention installed thereon.

Referring to FIG. 1, there is shown a vehicle steering column assembly that includes a lower stationary column member 10 and an upper tiltable steering column member 12 connected together by a pivot connection 14, whereby column member 12 is capable of tilting adjustment around the pivot connection axis. A steering wheel 16 is located at the upper end of column member 12.

The interior spaces within column members 10 and 12 are occupied by rotary shafts that are connected by a universal joint centered on the axis of pivot connection 14. Steering wheel 16 is attached to the shaft located within column member 12.

The present invention is concerned with a locking mechanism for retaining column member 12 in selected positions of tilt adjustment. In FIG. 1, dashed lines show the downward limit of tilt adjustment for column member 12. Column member 12 can be tilted upwardly from the full line position to a similar extent. Typically, column member 12 can be tiltably adjusted downwardly from its full line position by approximately thirteen degrees, and upwardly from its full line position by a similar number of degrees.

The locking mechanism for retaining column member 12 in selected positions of tilt adjustment (up or down) comprises an externally threaded rod 18 having a first pivot connection 20 to column member 12 and a second pivot connection 22 to column member 10. By adjusting the location of the pivot connection 22 on the longitudinal axis 26 of rod 18 it is possible to vary the effective length of the rod and the tilt angle of column member 12 around the axis of pivot connection 14.

Pivot connection 20 comprises two parallel ears 21 extending downwardly from column member 12, and a pivot shaft 23 extending transversely through ears 21 and the upper end of rod 18. Pivot connection 22 comprises a pivot shaft 24 extending between two parallel ears 25 depending from column member 10. Pivot connection 22 further includes an axial slot 27 formed in rod 18, such that shaft 24 extends transversely through the slot. Rod 18 can rotate on shaft 24 and also slide longitudinally on the shaft, to vary the effective length of the rod, i.e. the distance between pivot connections 22 and 20.

Figure 4:
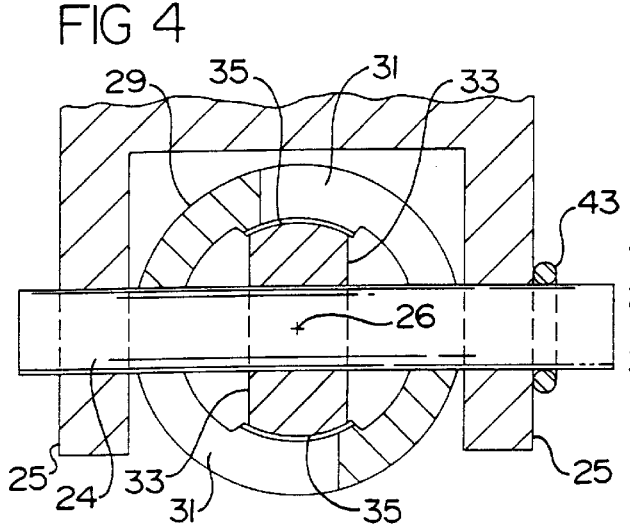
FIG. 4 is a transverse sectional view taken on line 4—4 in FIG. 3
Figure 6:
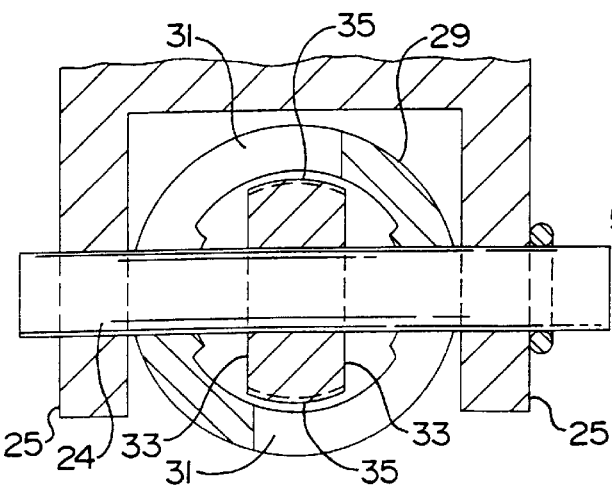
FIG. 6 is a sectional view taken in the same direction as FIG. 4, but showing the lock components in a different position of adjustment.

Rod 18 is longitudinally stabilized on shaft 24 by means of a sleeve 29 that encircles the rod. The sleeve has two arcuate circumferential slots 31 embracing shaft 24, whereby the sleeve can be rotated on rod 18 a limited distance around rod axis 26. In the illustrated apparatus, slots 31 permit sleeve 29 to rotate approximately ninety degrees around rod axis 26. FIG. 4 shows sleeve 29 at one limit of the sleeve rotational movement. FIG. 6 shows sleeve 29 at the other limit of the rotational movement.

Rod 18 has two parallel flat side surfaces 33 extending the full length of the rod, and two arcuate serrated surfaces 35 connecting flat surfaces 33. The serrations form diametrically opposed external teeth on the rod. The serrated arcuate surfaces 35 are centered on rod axis 24.

Sleeve 29 has two internal arcuate serrated surfaces 37 separated by two arcuate smooth surfaces 39. The internal teeth formed by serrated surfaces 37 have the same pitch as the external teeth on rod 18, so that when sleeve 29 is rotated to the position depicted in FIGS. 4 and 5 the internal teeth on the sleeve mesh with the external teeth on rod 18.

Figure 5:
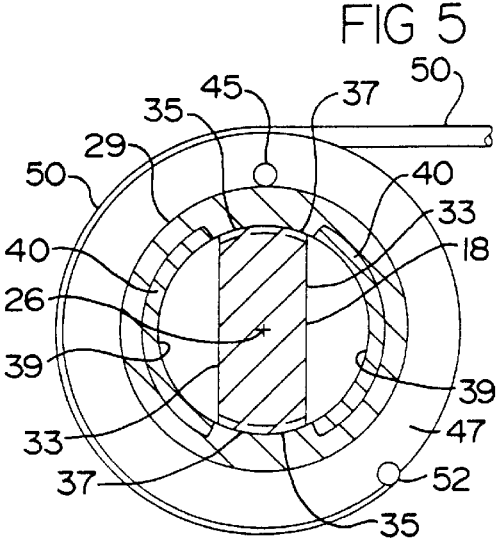
FIG. 5 is a transverse sectional view taken on line 5—5 in FIG. 3

When sleeve 29 is rotated to the position depicted in FIGS. 4 and 5, the meshed teeth prevent axial movement of rod 18 within sleeve 29. Slots 31 in the sleeve are in a circumferential plane that intersects the axial plane of slot 27 in rod 18, whereby sleeve 29 prevents the rod from movement relative to pivot shaft 24.

Figure 7:
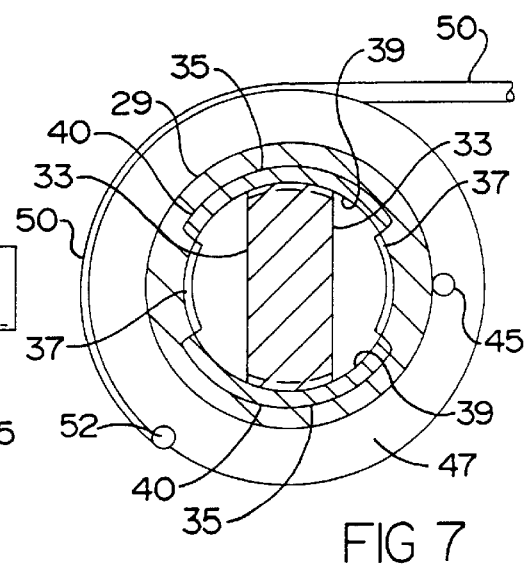
FIG. 7 is a sectional view taken in the same direction as FIG. 5, but with the lock components adjusted to the position of FIG. 6.

When sleeve 29 is rotated to the position depicted in FIGS. 6 and 7 the internal teeth in sleeve 29 are out of mesh with the external teeth on rod 18. Rod 18 can thereby be moved longitudinally (on rod axis 26) along shaft 24 a limited distance dictated by the length of slot 27. Such movement of the rod can be used to move pivot shaft 20 around pivot connection 14, thereby adjusting the tilt angle of column member 12.

Referring to FIG. 1, pivot shaft 20 is shown in three positions, i.e. an intermediate full line position, a limit position 20a wherein rod 18 is advanced upwardly to tilt column member 12 upwardly, and a second limit position 20b wherein rod 18 is retracted downwardly to tilt column member downwardly. Slot 27 limits the rod 18 movement. Rod 18 can have various adjusted positions between limiting positions 20a and 20b. The number of discrete rod pistons is determined by the pitch distance for the teeth on rod 18 and sleeve 29.

During longitudinal movement of rod 18 within sleeve 29, internal arcuate surfaces 39 on the sleeve act as bearings to maintain the rod in a centered position relative to the sleeve. For manufacturing reasons, each smooth arcuate surface 39 is formed by an arcuate insert member 40 installed within sleeve 29 after the sleeve has been machined to form the diametrically opposed serrated surfaces 37. The exposed arcuate surfaces 39, formed by inserts 40, have a diameter that is the same as the diameter of the arcuate toothed surfaces 35 on rod 18, so that when sleeve 29 is in the position depicted in FIGS. 6 and 7 the arcuate smooth surfaces will function as bearing surfaces to maintain the sleeve in a centered position on rod 18; i.e. the axis of sleeve 29 is coincident with the rod axis 26. This is beneficial in that the rod can be moved axially within the sleeve without binding or cocking in the sleeve.

Each arcuate insert 40 extends from the right end of sleeve 29 about one half the sleeve length. Inserts 40 are not visible in FIGS. 4 and 6 because the viewing plane for FIG. 4 is beyond the left ends of the inserts. The inserts are of sufficient length to function as bearings for rod 18 when the sleeve is in the FIG. 7 position.

Figure 2:
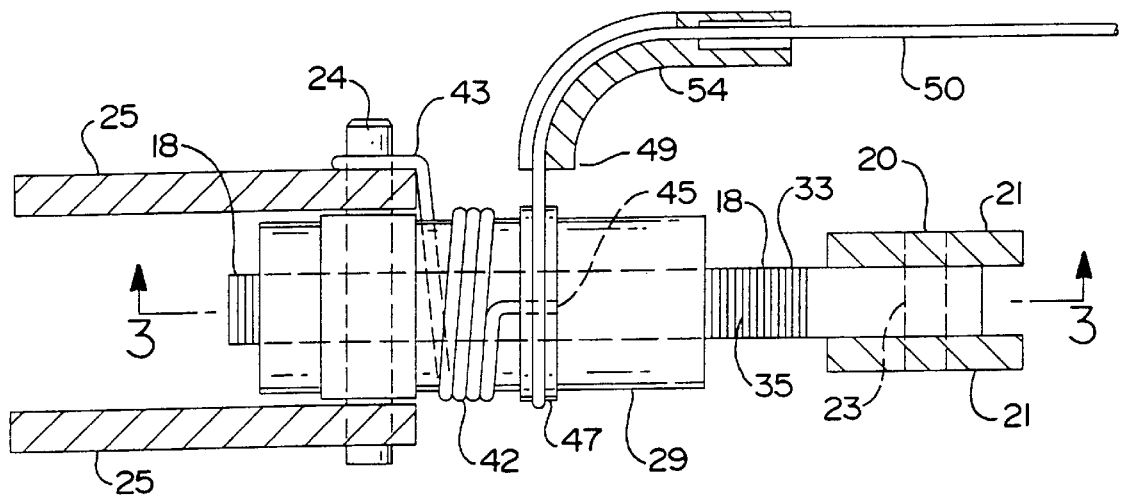
FIG. 2 is a fragmentary sectional view taken on line 2—2 in FIG. 1
Figure 3:
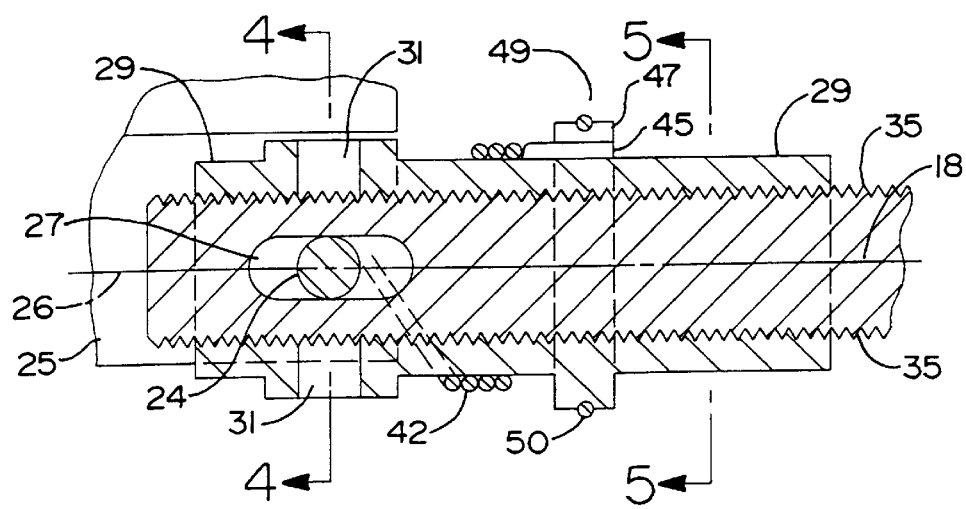
FIG. 3 is a sectional view taken on line 3—3 in FIG. 2

Sleeve 29 is rotated to the position depicted in FIGS. 4 and 5 by a torsion coil spring 42 encircling the sleeve. As shown in FIGS. 1 and 2, end 43 of the torsion spring is anchored to shaft 24. The other end 45 of the torsion spring extends into a small hole in an externally grooved flange 47 formed on sleeve 29. The torsion coil spring 42 is wound so as to exert a counterclockwise biasing force on sleeve 29, as the sleeve is viewed in FIGS. 5 and 7.

Sleeve 29 is rotated to the position depicted in FIGS. 6 and 7 by a manual cable means, referenced generally by numeral 49. The cable means comprises a flexible wire (small diameter cable) 50 having one end anchored at 52 on the grooved flange 47. The flexible wire extends partially around the grooved flange on sleeve 29, and then around an arcuate guide 54 that is suitably attached to the undersurface of column member 10.

As shown in FIG. 1, wire 50 extends rightwardly from arcuate guide 54 to an anchored connection 56 with an arm 57. Arm 57 has a hub portion 58 that is rotatable on a shaft 60 extending laterally from column member 12. The outer end of shaft 60 mounts a manually depressible handle 62.

Manual depression of handle 62 around the shaft 60 axis moves wire 50 in the arrow 61 direction (FIG. 1), such that the wire rotates sleeve 29 in a clockwise direction, as viewed in FIGS. 5 and 7. When handle 62 is manually depressed, sleeve 29 is rotated from the position depicted in FIGS. 4 and 5 to the position depicted in FIGS. 6 and 7. When the manual pressure on handle 62 is removed, torsion spring 42 rotates sleeve 29 from the position shown in FIGS. 6 and 7 to the position shown in FIGS. 4 and 5.

FIGS. 4 and 5 depict the normal position of sleeve 29, wherein the external teeth on rod 18 are in mesh with the internal teeth on sleeve 29. The sleeve is locked to rod 18 so that the rod forms a rigid connection between shaft 23 on column member 12 and shaft 24 on column member 10. Column member 12 is thereby retained in a fixed relation to column member 10.

In order to change the tilt setting of column member 12 (up or down around pivot connection 14) handle 62 is manually depressed to rotate sleeve 29 from the position depicted in FIGS. 4 and 5 to the position depicted in FIGS. 6 and 7. The internal teeth on sleeve 29 are thereby moved out of mesh with the external teeth on rod 18, as shown in FIG. 7. Column member 12 can then be freely rotated around the axis of pivot connection 14 to any desired tilted position within limits.

When column member 12 is moved around the axis of pivot connection 14, rod 18 slides freely along rod axis 26 to establish a new relation between slot 27 and shaft 24. The effective length of rod 18, between shafts 23 and 24, is changed in accordance with the movement of column member 12. With column member 12 in the new (desired) position, manual pressure on handle 62 is released, such that torsion coil spring 42 returns sleeve 29 to the position depicted in FIGS. 4 and 5. The internal teeth on sleeve 29 move into mesh with the external teeth on rod 18, such that rod 28 is prevented from longitudinal axial movement along rod axis 26. Sleeve 29 serves as a rigid connector between rod 18 and shaft 24.

One advantage of the illustrated locking adjustment mechanism is that the internal teeth on sleeve 29 cannot inadvertently disengage from the external teeth on rod 18. As shown in FIG. 5, rod 18 completely fills the vertical space within sleeve 29. The sleeve cannot vibrate in the vertical plane so as to disengage the meshed teeth. In high impact accident situations sleeve 29 will remain in the locked condition on rod 18.

A further advantage of the illustrated mechanism is that in any locked position a relatively large number of teeth are in mesh. Rod 18 has teeth on both its upper surface and its lower surface. Also, the rod and sleeve have large cross section walls presented to the expected load forces (acting primarily parallel to rod axis 26). This mechanism also provides a high degree of adjustment with many tilt positions. In one embodiment, this design provides thirteen positions of adjustment.

The illustrated locking mechanism can be constructed as a relatively small size assembly without greatly reducing its strength or ability to handle the expected load forces. As shown in the drawings, the locking mechanism is located externally relative to column members 10 and 12, such that the locking mechanism can be modularized as a separate assembly capable of interchangeable use with a range of different steering columns without extensive tooling changes or structural modifications in the locking mechanism or steering column.

The drawings show rod 18 as having an adjustment slot 27 and sleeve 29 cooperable with shaft 24 on the stationary column member 10. However, the adjustment slot 27 and sleeve 29 could be relocated so as to interact with shaft 23 on movable column member 12.

Figure 8:
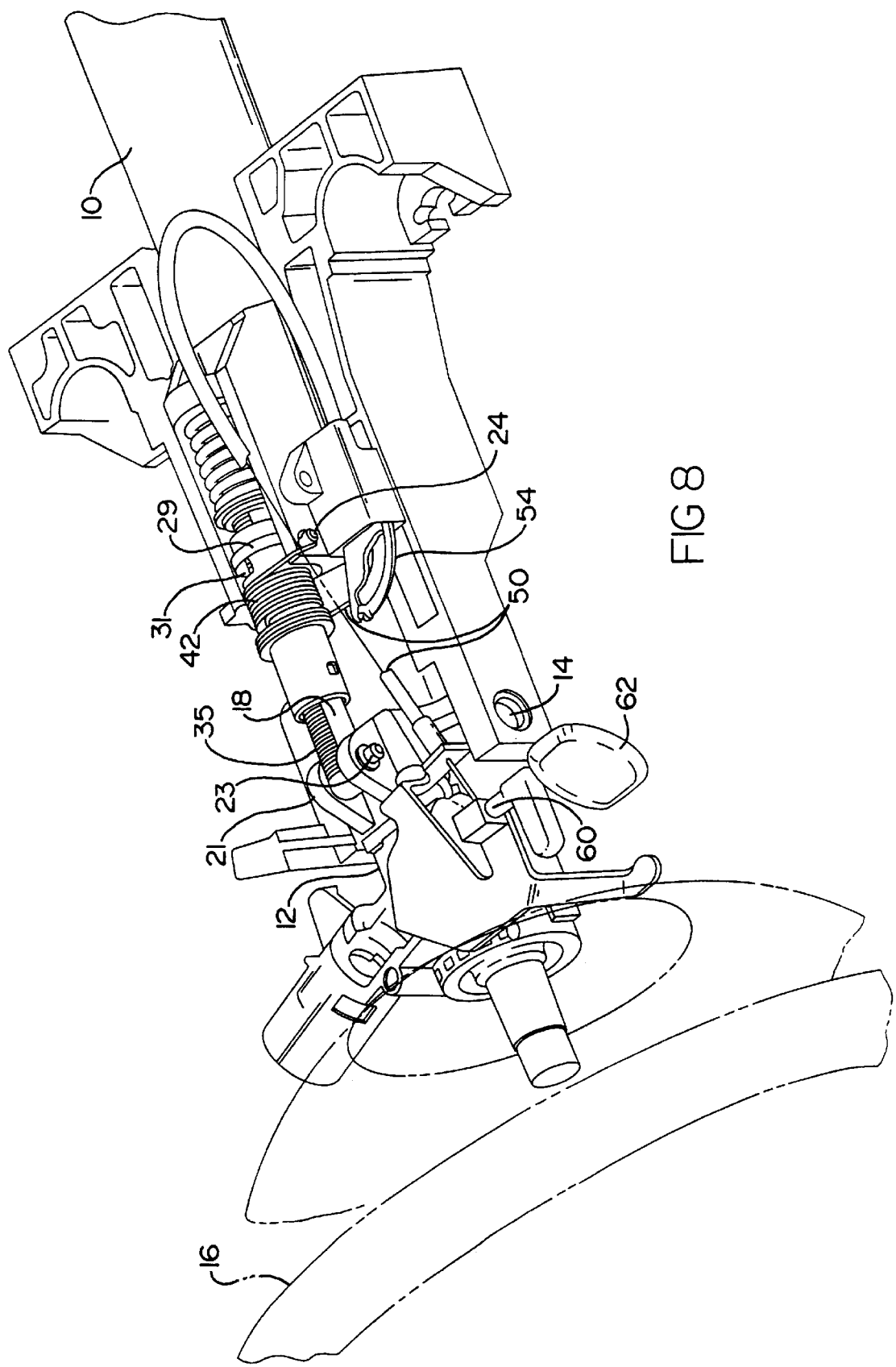
FIG. 8 is a bottom perspective view of another embodiment of the invention adapted within a tilt lock vehicle steering column.

Another embodiment of the invention is shown in FIG. 8. The tilt lock mechanism of FIG. 8 operates substantially the same as that discussed above.

Within the broader scope of the invention, it is believed that the illustrated locking mechanism could be used with movable and stationary members, other than the steering column members.

What is claimed:

1. An articulated tiltable steering column comprising an upper steering wheel column member, a lower stationary steering column member, a pivot connection between said upper and lower column members, whereby a steering wheel can be tiltably adjusted around the pivot connection to selected positions of adjustment; and a locking mechanism for retaining said column members in selected positions of adjustment, said locking mechanism comprising an externally threaded rod trained between the column members, and an internally threaded sleeve encircling said rod;

said rod having a longitudinal axis; said rod having a first pivot means connecting the rod to one of the column members, and a second pivot means connecting the rod to the other column member;

said second pivot means comprising a pivot shaft carried by said other column member and an axial slot in said rod slidable on said pivot shaft;

said sleeve having a circumferential slot embracing said pivot shaft; said rod comprising a first set of circumferentially discontinuous external teeth; said sleeve comprising a second set of circumferentially discontinuous internal teeth; said internal teeth being in mesh with said external teeth when said sleeve is rotated in one direction; said internal teeth being out of mesh with said external teeth when said sleeve is rotated in the opposite direction.

2. The steering column of claim 1, wherein said rod has two flat parallel side surfaces and two toothed surfaces spanning said side surfaces; said sleeve having two diametrically opposed toothed surfaces separated by two non-toothed surfaces;

said sleeve being rotatable on said rod so that in a first rotated position of said sleeve the toothed surfaces on the sleeve and rod are in mesh, and in a second rotated position of said sleeve the toothed surfaces on the sleeve and rod are out of mesh.

3. The steering column of claim 2, wherein the non-toothed surfaces on said sleeve are arcuate surfaces having the same diameter as the toothed surfaces on rod, whereby the sleeve is maintained in a centered position on the rod when the sleeve is in the second rotated position.

4. The steering column of claim 1, wherein said locking mechanism further comprises spring means for rotating said sleeve in said one direction, and a manual cable means for rotating said sleeve in said opposite direction.

5. The steering column of claim 4, wherein said spring means comprises a torsion spring encircling said sleeve.

6. The steering column of claim 4, wherein said manual cable means partially encircles said sleeve.

* * * * *